United States Patent
Verrat-Debailleul et al.

(10) Patent No.: US 9,568,180 B2
(45) Date of Patent: Feb. 14, 2017

(54) LIGHT-UP WINDOW FOR A VEHICLE

(71) Applicant: SAINT-GOBAIN GLASS FRANCE, Courbevoie (FR)

(72) Inventors: Adele Verrat-Debailleul, Villers-sur-Coudun (FR); Pascal Bauerle, Roye (FR); Laeticia Laurencot, Margny les Compiegne (FR); Christophe Kleo, Attichy (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 91 days.

(21) Appl. No.: 14/366,491

(22) PCT Filed: Dec. 12, 2012

(86) PCT No.: PCT/FR2012/052900
§ 371 (c)(1),
(2) Date: Jun. 18, 2014

(87) PCT Pub. No.: WO2013/093301
PCT Pub. Date: Jun. 27, 2013

(65) Prior Publication Data
US 2014/0362597 A1    Dec. 11, 2014

(30) Foreign Application Priority Data

Dec. 19, 2011 (FR) .................................... 11 61885

(51) Int. Cl.
*F21V 29/00* (2015.01)
*B60Q 3/00* (2006.01)
(Continued)

(52) U.S. Cl.
CPC ..... *F21V 29/2206* (2013.01); *B32B 17/10036* (2013.01); *B32B 17/1077* (2013.01);
(Continued)

(58) Field of Classification Search
CPC ............................ F21V 29/2206; F21V 29/74
See application file for complete search history.

(56) References Cited

U.S. PATENT DOCUMENTS 5,821,692 A * 10/1998 Rogers .................. H01L 51/529
313/493
2008/0284308 A1    11/2008 Pang
(Continued)

FOREIGN PATENT DOCUMENTS

FR    2 937 711 A1    4/2010
FR    2 955 530 A1    7/2011
(Continued)

OTHER PUBLICATIONS

International Search Report issued Mar. 26, 2013, in PCT/FR2012/052900, filed Dec. 12, 2012.

*Primary Examiner* — Joseph L Williams
(74) *Attorney, Agent, or Firm* — Oblon, McClelland, Maier & Neustadt, L.L.P.

(57) ABSTRACT

An illuminating glazing unit for vehicles, including: a first transparent sheet of glass with a first main face, a second main face, and an edge; one or more modules including light-emitting diodes (LEDs), each including a plurality of LEDs and associated electronic components fixed to a printed circuit board, the modules being positioned such that emitting faces of the LEDs are turned toward the edge of the first sheet of glass; an encapsulation mechanism in contact with the first main face of the first sheet; a light extraction element, which can be located on one of the main faces of the first sheet of glass; and a heat sink element, in thermal conduction contact with the LED module, in contact with the encapsulation mechanism, and in contact with an atmosphere via a heat exchange surface.

18 Claims, 1 Drawing Sheet

(51) Int. Cl.
  *B60Q 1/26*     (2006.01)
  *B60Q 3/02*     (2006.01)
  *B32B 17/10*    (2006.01)
  *F21V 29/74*    (2015.01)
  *F21V 8/00*     (2006.01)
  *F21W 101/00*   (2006.01)
  *F21Y 101/00*   (2016.01)

(52) U.S. Cl.
  CPC .. *B32B 17/10541* (2013.01); *B32B 17/10761* (2013.01); *B32B 17/10788* (2013.01); *B60Q 1/26* (2013.01); *B60Q 1/268* (2013.01); *B60Q 3/002* (2013.01); *B60Q 3/0213* (2013.01); *F21V 29/74* (2015.01); *F21W 2101/00* (2013.01); *F21Y 2101/00* (2013.01); *G02B 6/0043* (2013.01); *G02B 6/0068* (2013.01); *G02B 6/0073* (2013.01); *G02B 6/0081* (2013.01)

(56) References Cited

U.S. PATENT DOCUMENTS

| 2010/0002437 | A1  | 1/2010  | Pang et al. |           |
|---|---|---|---|---|
| 2011/0273874 | A1* | 11/2011 | Verrat-Debailleul | B60Q 3/0213 |
|              |     |         |             | 362/231   |
| 2013/0033894 | A1  | 2/2013  | Kleo et al. |           |

FOREIGN PATENT DOCUMENTS

| JP | 2004-271734 | 9/2004  |
|---|---|---|
| JP | 2006-169861 | 6/2006  |
| JP | 2007-67076  | 3/2007  |
| JP | 2008-275920 | 11/2008 |
| JP | 2010-9845   | 1/2010  |

* cited by examiner

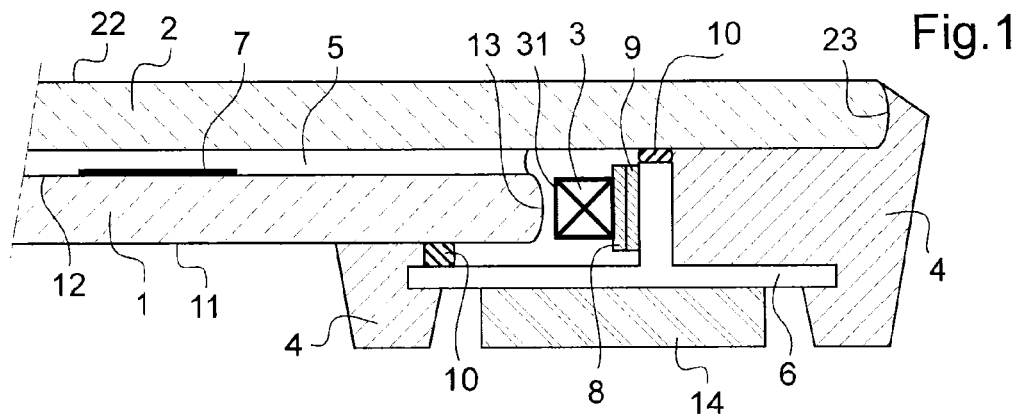
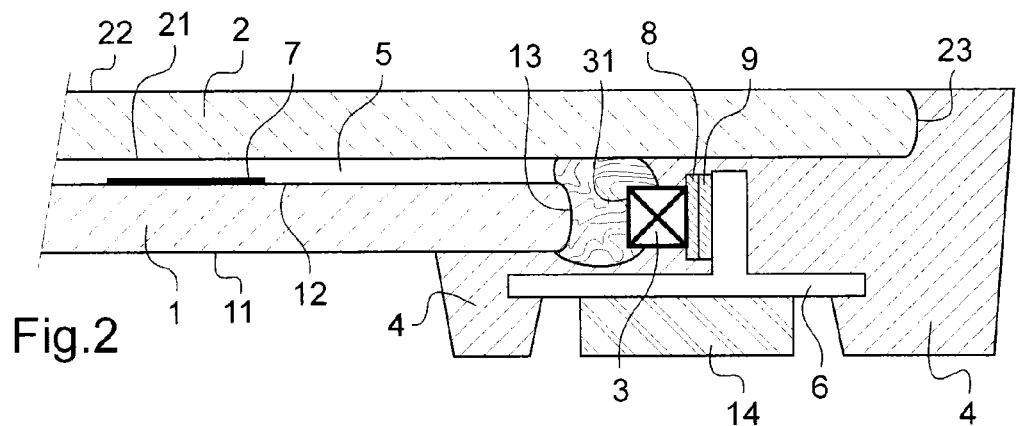
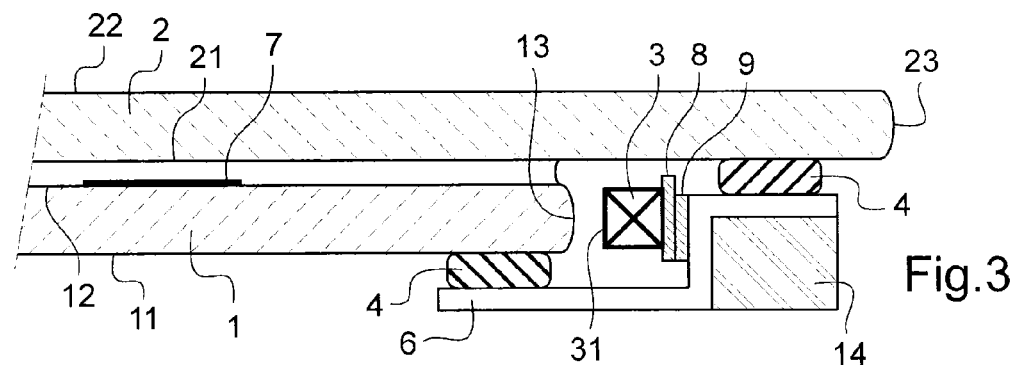
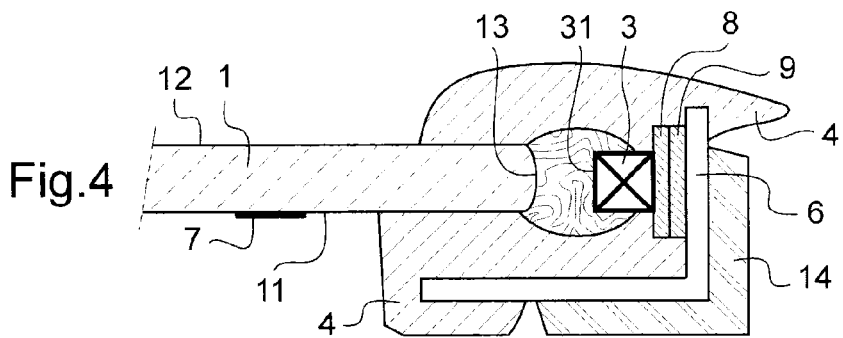

LIGHT-UP WINDOW FOR A VEHICLE

The present invention relates to an illuminating glazing unit for vehicles, particularly an illuminating glazing unit forming part of the roof of a motor vehicle.

There is a known way of incorporating light-emitting diode modules (LED modules) in the edges of single-layer or laminated glazing units, in such a way that the light emitted by the LEDs enters through the edge of a glass sheet and is guided by the sheet to a diffusing element, also known as a light extraction means.

These illuminating glazing units essentially have the function of ambient lighting or light signaling, using low-power LEDs for this purpose. The light output of these edge-illuminated glazing units is generally limited because of the losses of light by absorption of the light by the glass acting as the waveguide and/or the materials in the proximity thereof.

Since it is usually difficult or even impossible to make significant reductions in losses of light by absorption, another possible way of obtaining higher illuminating power would be to use more powerful light sources.

However, it is known that increasing the power of LEDs in this way inevitably leads to an increase in the heat given off by these devices. This is because, for a given light output, the amount of this heat is substantially proportional to the power of the LED and to the electricity consumption of the module. If this heat is not efficiently removed, it results in an undesired increase in the temperature of the LED module which, in virtually all cases, tends to shorten the life of the LEDs and other electrical components of the module.

In the field of edge-illuminated glazing units, it is often difficult to remove the heat generated by LED modules during their operation. This is because, particularly in the field of motor vehicles or other vehicles, it is often necessary to protect the LED modules from the action of moisture which is always present. This protection is commonly provided either by encapsulation, that is to say overmolding the LED modules with an organic polymer, for example polyurethane, injected in liquid form and then hardened, or by housing the LED modules in a removable or non-removable way in more or less watertight casings.

The problem of the increase in temperature of relatively powerful LED modules in a confined environment has been resolved in the present invention by the incorporation of a heat sink element at the edge of the glazing unit. This element is in thermal conduction contact with the LED modules and, owing to its high thermal conductivity and large free surface in contact with the atmosphere, enables the heat to be removed from the LED modules and enables an excessive temperature increase in the immediate environment of the LEDs to be prevented in an efficient way.

The present invention therefore proposes an illuminating glazing unit for vehicles, comprising
 a first sheet of transparent glass with a first main face, a second main face and an edge,
 one or more modules containing light-emitting diodes (LED modules), each having a plurality of light-emitting diodes (LEDs) and associated electronic components, fixed to a printed circuit board (PCB), the modules being positioned in such a way that the emitting faces of the LEDs are turned toward the edge of the first sheet,
 an encapsulation means in contact with the first main face of the first sheet of glass, and
 a light extraction element, preferably located on one of the main faces of the first sheet, this glazing unit according to the invention being distinguished from known LED glazing units in that the glazing unit further comprises a heat sink element which is in thermal conduction contact with the LED module, and is in contact with the encapsulation means and in contact with the atmosphere via a heat exchange surface (S).

The LED modules are preferably chosen so that the thermal energy given off per unit of length of a module when the module is switched on is at least equal to 1 W per decimeter, preferably in the range from 2 to 6 W/dm, and particularly from 2.5 to 5 W/dm.

The thermal energy given off by the LED modules depends not only on their electricity consumption, expressed in watts, but also on the light output. In fact, for a given level of electricity consumption, the heat given off increases as the light output decreases. However, this does not in any way mean that an attempt is made in the present invention to use LED modules with a low light output which give off a large amount of heat. The reason why the present invention is additionally defined with the aid of this parameter is simply that, below a certain level, the heat generated by the modules does not lead to an undesired temperature increase, and the technical problem of the shortening of the life of the LEDs is present to a lesser degree or even entirely absent.

However, a person skilled in the art will understand that it is difficult to define a precise threshold for this value, which depends on factors that may include the state of confinement of the LED modules, the resistance of the LEDs to high temperatures, or the degree of shortening of the life of the LEDs that is considered acceptable.

In an advantageous embodiment, the illuminating glazing unit of the present invention is a laminated glazing unit having two sheets of glass bonded together by means of a lamination interlayer.

The glazing units according to the present invention therefore preferably comprise, in addition to the first sheet, a second sheet of transparent glass with a first main face, a second main face and an edge, and a transparent lamination interlayer in adhesive contact with the second main face of the first sheet of glass and the first main face of the second sheet of glass.

In the present application, the term "first sheet" always signifies the edge-illuminated sheet, and the second sheet is generally not illuminated. The glazing unit according to the invention is preferably mounted on the vehicle in such a way that the first sheet is the one in contact with the passenger compartment of the vehicle and the second sheet is the one located nearer the outside of the vehicle, commonly in direct contact with the atmosphere outside the vehicle.

The term "first main surface" signifies, in relation to both the first and the second sheet, the face of the sheet turned toward the inside of the vehicle. Logically, the term "second main surface" signifies the surface of each sheet which faces, or is intended to face, toward the outside of the vehicle.

The lamination interlayer used in laminated glazing units may be made of any transparent polymer material commonly used for this purpose, for example poly(vinyl butyral) (PVB), thermoplastic polyurethane (TPU) or ethylene vinyl acetate copolymer (EVA).

The second sheet is preferably larger than the first, so that it extends beyond the latter over at least a part of its periphery. The edge illumination system including LED modules, the encapsulation and/or the heat sink element is then applied onto the first surface of the second sheet at a point where it extends beyond the first sheet.

Theoretically, it is possible to use what are known as "tropicalized" LED modules, that is to say those which are covered with a resin to make them less sensitive, or immune, to atmospheric moisture, but this tropicalization is not essential, since the function of protecting the LEDs is preferably provided in the present invention by the combination of the encapsulation means and the heat sink. In other words, the heat sink element interacts with the encapsulation means so as to enclose the LED modules and isolate them from the atmosphere, preferably in a watertight way and preferably also in an airtight and water vapor-tight way.

In one embodiment of the present invention, the heat sink has a plate-shaped part which acts as a cover to close a space delimited by the encapsulation means. In this case, the encapsulation means takes the form of a bead or a profiled element surrounding and delimiting an area in which one or more LED modules are housed, and the heat sink interacts with the encapsulation means so as to cover the LED module or modules and close the space in which they are housed.

The encapsulation means may be an element prepared by injection molding or may be a preformed bead, such as a bead of adhesive or elastomer, applied and fixed at the border of the glazing unit, on the first main face of the first sheet and also, if necessary, on the first main face of the second sheet if the geometry of the border of the glazing unit is suitable for this.

However, the heat sink does not necessarily act as a cover for the space in which the LEDs are housed. It may be simply a piece made of a heat-conducting material, of more or less complex shape, which is in thermal conduction contact with the LED modules. In this case, the encapsulation means may be manufactured by overmolding, which covers, at least partially, the LED modules and the part of the heat sink in contact with these. Clearly, the encapsulation means must leave the heat exchange surface (S) of the heat sink element free. In order to ensure that the encapsulation means, which is generally opaque, does not obstruct the optical coupling space between the emitting faces of the LEDs and the edge of the first sheet, it may be necessary to fill this space with a transparent adhesive.

The capacity of the heat sink to efficiently remove the thermal energy given off by the LEDs and the other electronic components of the LED modules depends on:
- the extent and efficacy of the contact with the LED modules,
- the thermal conductivity of the material from which it is made, and
- the heat exchange surface in contact with the atmosphere.

The thermal conductivity ($\lambda$) of the heat sink used in the present invention is preferably at least 180 W/mK, particularly at least 200 W/mK, and particularly preferably at least 230 W/mK.

The material of the heat sink is preferably chosen from among metals or metal alloys, aluminum and its alloys being particularly preferable since they have a low cost, low weight and a thermal conductivity of more than 230 W/mK.

The heat sink is in contact with the LED module or modules, generally via the PCB on which the LEDs are mounted. Clearly, it is desirable to maximize the contact surface between the PCB and the heat sink. It may be helpful to bond these two elements together with a thermal adhesive.

Finally, the geometry of the heat sink obviously has a decisive effect on its efficacy. In a preferred embodiment, the heat sink has a plurality of fins in contact with the atmosphere, these fins constituting at least 50%, or preferably at least 60%, of the heat exchange surface (S) of the heat sink.

In the embodiment described above, in which the heat sink has a plate-shaped part covering a space containing the LEDs, the fins are preferably located on the face of this plate-shaped part opposite the face that is turned toward the LEDs. When the space containing the LEDs has been covered by the heat sink, the fins are thus directed toward the outside, in contact with the external atmosphere of the vehicle or with the atmosphere of the passenger compartment.

In a preferred embodiment, the heat sink element has sufficient thermal conductivity and a sufficient heat exchange surface (S) in contact with the atmosphere to ensure that the temperature increase of the LEDs during operation is not more than about 40° C., preferably not more than about 30° C., and particularly not more than about 20° C. This increase is to be understood as relative to the temperature of the LEDs when the LED modules are switched off.

The LEDs may be side emitting LEDs or top emitting LEDs. Top emitting LEDs form a preferred embodiment. This is because this type of LED is available on the market in the widest variety of shapes and at low cost.

The light extraction means may theoretically be located on one of the two main faces of the first sheet of glass, on one of the two faces of the second sheet of glass, if present, or in the thickness of these two sheets. It may be a diffusing enamel or a diffusing ink applied by printing to one of the main faces of the glass sheets or to one of the faces of the lamination interlayer. The diffusing coating may be semi-opaque or opaque.

Although all these possible options are feasible, some are preferable for the purpose of optimizing the overall light output of the glazing unit. In the interests of this optimization, it is particularly preferable for the means used as a light extraction element to be an essentially opaque diffusing coating, preferably white in color, located on the second main face of the first sheet. This is because this embodiment has the advantage, as compared with a semi-opaque coating on the first main face of the first sheet, of diffusing the maximum amount of light toward the inside of the vehicle, while minimizing the amount of light lost by diffusion toward the outside.

The glazing unit according to the invention preferably has an illuminating power, when all the LEDs contained in it are lit, of at least 5 lumens, preferably in the range from 6 to 40 lumens, and particularly from 7 to 30 lumens.

Evidently, the present invention also proposes a vehicle, preferably a motor vehicle, having an illuminating glazing unit as described above. This illuminating glazing unit may be a side glazing unit, but it preferably forms part of the roof of the vehicle.

The present invention will now be illustrated with reference to some embodiments shown in the appended drawings, in which FIG. 1 shows, in cross section, the edge of a laminated glazing unit in which the heat sink element covers a space containing the LEDs.

FIG. 2 shows, in cross section, another embodiment of a laminated glazing unit according to the invention, in which the heat sink element does not cover a space containing the LEDs, but is partially encapsulated.

FIG. 3 shows, in cross section, a third embodiment of a laminated glazing unit according to the invention, in which the encapsulation is present in the form of two beads of adhesive fixing the heat sink to the glass sheets.

Finally, FIG. 4 shows a fourth embodiment of a single-sheet glazing unit according to the invention.

More particularly, FIG. 1 shows the edge of a laminated glazing unit having a first sheet of glass 1, a second sheet of glass 2, and a lamination interlayer 5, in adhesive contact with the second main face 12 of the first sheet of glass 1 and the first main face 21 of the second sheet of glass 2. The first main face 11 of the first sheet 1 is in contact with the inside of the vehicle, and the second main face 22 of the second sheet of glass 2 is turned toward the outside of the vehicle.

The second sheet of glass is larger than the first sheet of glass and serves to support part of the encapsulation element 4 and the heat sink 6. The LED module 8 with a top emitting LED 3 is positioned so that the emitting face 31 of the LED 3 is turned toward the edge 13 of the first sheet of glass 1. The edge 23 of the second sheet of glass is covered by the encapsulation means 4.

The light injected by the LED at the edge 13 of the first sheet is guided by the latter as far as the light extraction element 7, which is a light-colored opaque diffusing enamel coating located on the second main face of the first sheet.

The heat sink element 6 has an overall cross section in the shape of an inverted letter T. The vertical part serves as a support for the LED module 8. The thermal conduction contact between the LED module 8 and the heat sink element 6 is provided by a layer of thermal adhesive 9. The horizontal part of the heat sink covers the space between the two parts of the encapsulation means 4.

The heat sink 6 is fixed to the first main surfaces of the first and the second sheet of glass by two beads of adhesive 10. These beads allow the heat sink 6 to be positioned for the purpose of the injection molding of the encapsulation means 4. In this embodiment, the optical coupling between the edge 13 and the emitting face 31 of the LED is provided simply by the air trapped between the heat sink and the glass sheets. The heat sink has a set of fins 14, only one of which is visible in FIG. 1. These fins are not covered by the encapsulation material. They form the essential part of the heat exchange surface of the heat sink.

FIG. 2 shows an embodiment of a glazing unit according to the invention which differs from that of FIG. 1 essentially in that the optical coupling between the emitting face 31 of the LED 3 is provided by a transparent adhesive 15. In this case, the heat sink element 6 in the shape of an inverted T does not cover a space containing the LEDs, but the encapsulation 4 fixes and partially encloses the heat sink 6 carrying the LED 3. Clearly, the fins 14 which form the heat exchange surface of the heat sink are not encapsulated, but remain free and in contact with the atmosphere.

In FIG. 3, the heat sink element 6 carrying the LED module 8 formed by the LED 3 and the PCB support has a cross section in the shape of a step. This heat sink is fixed to the first sheet 1 and the second sheet 2 by the encapsulation means 4 which in this case takes the form of two beads of adhesive. The optical coupling between the emitting face 31 of the LED 3 and the edge 13 is provided by air.

Finally, FIG. 4 shows an example of a single-sheet glazing unit according to the invention. The heat sink 6 in the form of a profiled element with an L-shaped cross section carries the LED module 8, which is fixed by means of a thermal adhesive 9. The optical coupling between the LED and the glass sheet is provided by a bead of transparent adhesive 15 which prevents the encapsulation means 4 from intruding into the space between the emitting face 31 of the LED and the edge 13 of the glass sheet 1. As in all the other embodiments described above, the encapsulation means leaves the surface of the fins 14 of the heat sink element 6 completely free.

The invention claimed is:

1. An illuminating glazing unit for vehicles, comprising:
    a first transparent sheet of glass having an edge, a first main face, and a second main face opposite the first main face;
    one or more modules including light-emitting diodes (LEDs), each including a plurality of light-emitting diodes and associated electronic components fixed to a printed circuit board, the modules being positioned such that emitting faces of the LEDs are turned toward the edge of the first sheet of glass;
    an encapsulation means in direct contact with the first main face of the first sheet;
    a light extraction element located on one of the main faces of the first sheet of glass;
    a heat sink element, which is in thermal conduction contact with the LED module, in contact with the encapsulation means, and in contact with the atmosphere via a heat exchange surface.

2. The illuminating glazing unit as claimed in claim 1, wherein thermal energy given off by the LED modules, when they are switched on, is at least equal to 1 W per decimeter.

3. The illuminating glazing unit as claimed in claim 1, further comprising a second transparent sheet including glass with a first main face, a second main face, and an edge, and a transparent lamination interlayer which is in adhesive contact with the second main face of the first sheet and the first main face of the second sheet of glass.

4. The illuminating glazing unit as claimed in claim 1, wherein the heat sink element interacts with the encapsulation means to enclose the LEDs and isolate the LEDs from the atmosphere.

5. The illuminating glazing unit as claimed in claim 1, wherein the encapsulation means takes a form of a bead or a profiled element surrounding and delimiting an area in which one or more LED modules are housed, the heat sink element interacting with the encapsulation means to cover the one or more LED modules and close a space in which the one or more LED modules are housed.

6. The illuminating glazing unit as claimed in claim 1, wherein the heat sink element interacts with the encapsulation means to isolate the one or more LED modules from the atmosphere in an airtight way.

7. The illuminating glazing unit as claimed in claim 1, wherein the heat sink includes a plurality of fins in contact with the atmosphere, the fins constituting at least 50%, of a heat exchange surface of the heat sink.

8. The illuminating glazing unit as claimed in claim 1, having a thermal conductivity equal to at least 180 W/mK.

9. The illuminating glazing unit as claimed in claim 1, wherein the heat sink element has sufficient thermal conductivity and a sufficient heat exchange surface in contact with the atmosphere to ensure that a temperature increase of the LEDs during operation is not more than 40°C.

10. The illuminating glazing unit as claimed claim 1, wherein the light extraction element is an opaque diffusing coating, or is white in color, located on the second main face of the first sheet.

11. The illuminating glazing unit as claimed in claim 1, wherein the LEDs are top emitting LEDs.

12. The illuminating glazing unit as claimed in claim 1, emitting, when lit, an illuminating power of at least 5 lumens.

13. A vehicle, or a motor vehicle, comprising an illuminating glazing unit as claimed in claim 1.

14. The vehicle as claimed in claim 13, wherein the illuminating glazing unit forms part of a roof of the vehicle.

15. The illuminating glazing unit as claimed in claim 1, wherein thermal energy given off by the LED modules, when they are switched on, is in a range from 2 to 6 W/dm.

16. The illuminating glazing unit as claimed in claim 1, wherein thermal energy given off by the LED modules, when they are switched on, is in a range from 2.5 to 5 W/dm.

17. The illuminating glazing unit as claimed in claim 1, emitting, when lit, an illuminating power in a range from 6 to 40 lumens.

18. The illuminating glazing unit as claimed in claim 1, emitting, when lit, an illuminating power in a range from 7 to 30 lumens.

* * * * *